July 22, 1969   A. D. BROWN   3,457,545
VISUAL APPROACH PATH INDICATOR
Filed Dec. 6, 1965   3 Sheets-Sheet 1
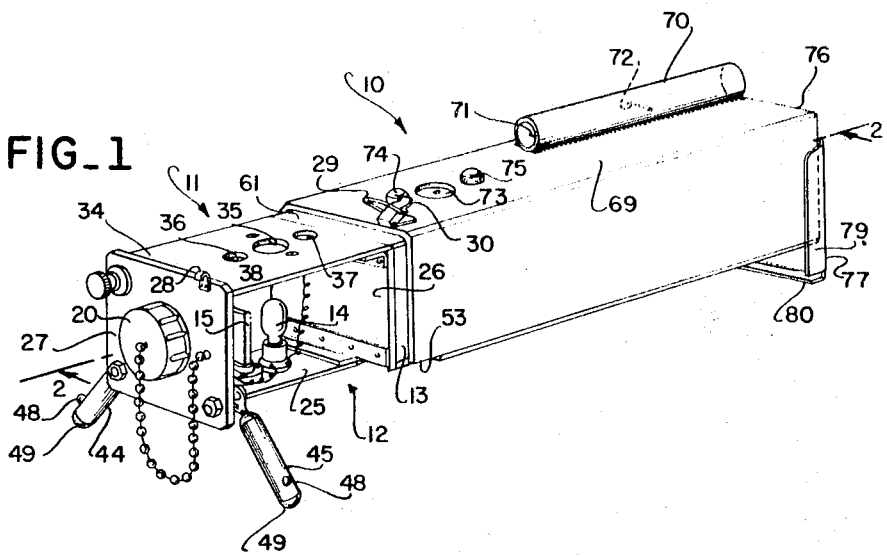
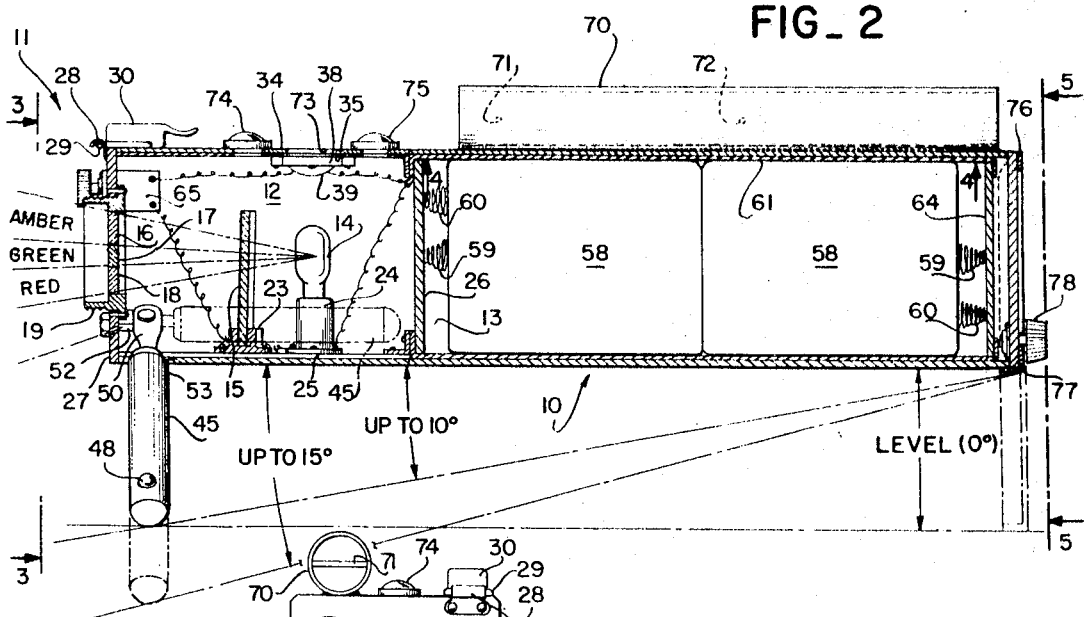
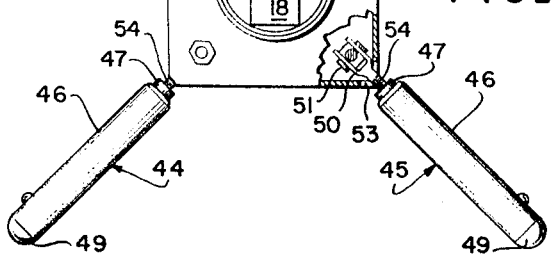
*INVENTOR.*
ALBERT D. BROWN
BY
George A. Sullivan
Agent July 22, 1969 A. D. BROWN 3,457,545
VISUAL APPROACH PATH INDICATOR
Filed Dec. 6, 1965 3 Sheets-Sheet 2
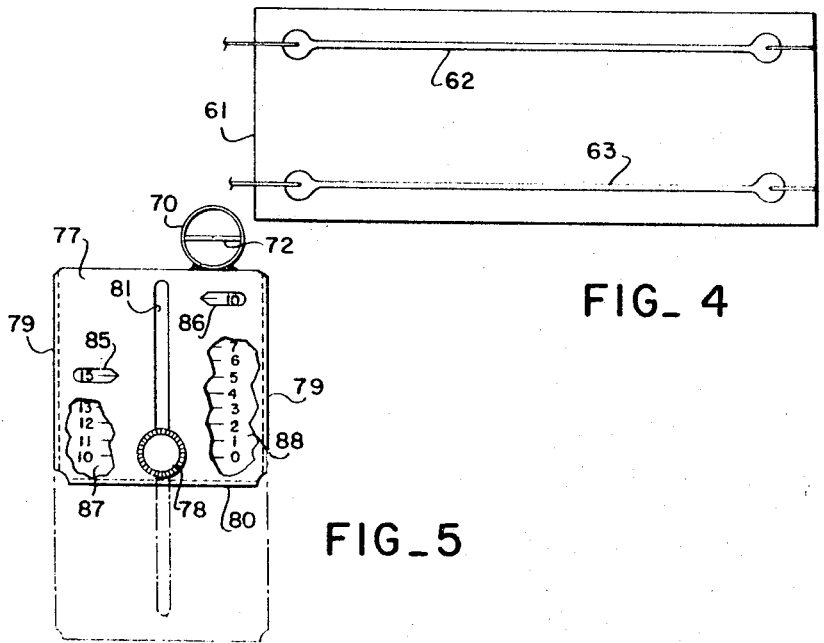
FIG. 4
FIG. 5
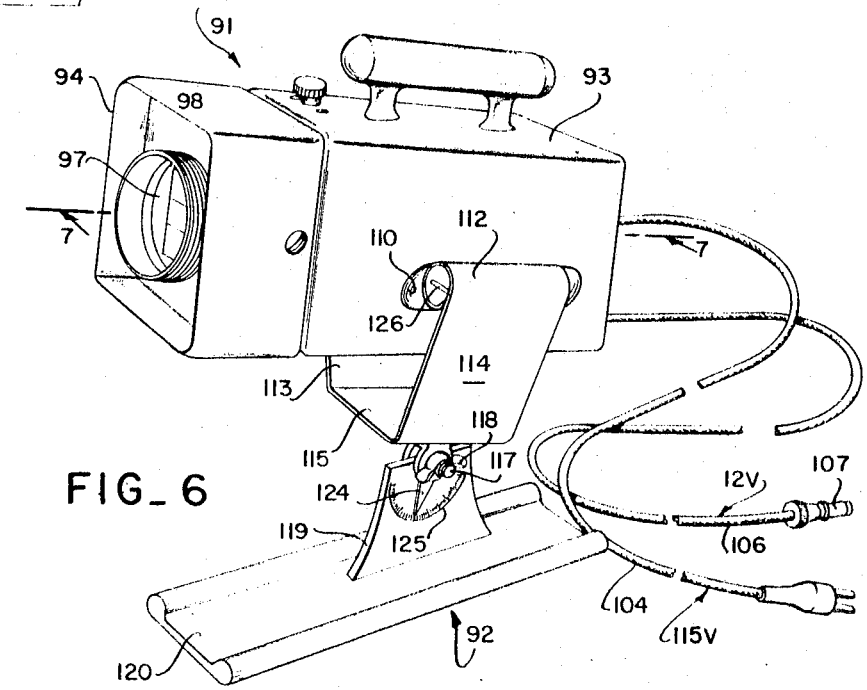
FIG. 6
INVENTOR.
ALBERT D. BROWN
BY
George C. Sullivan
Agent

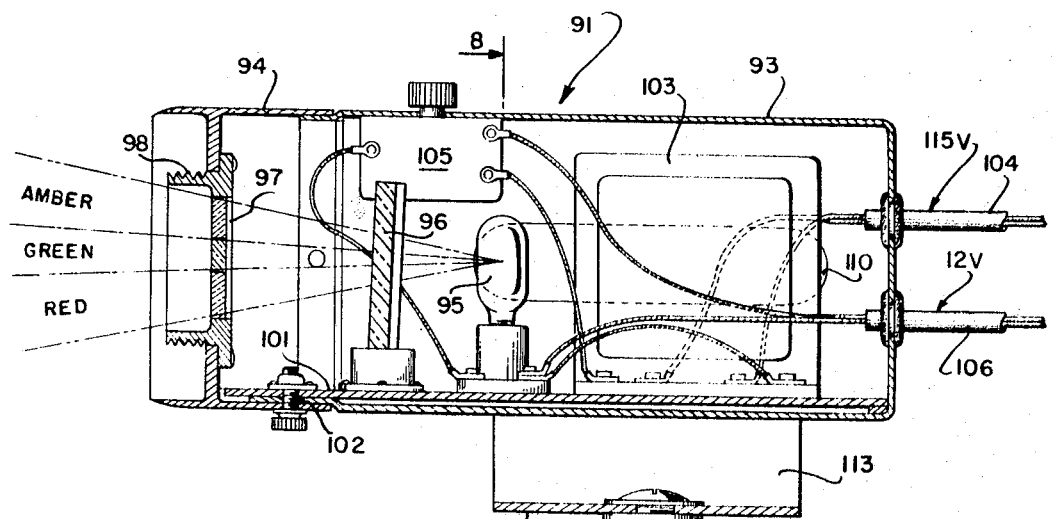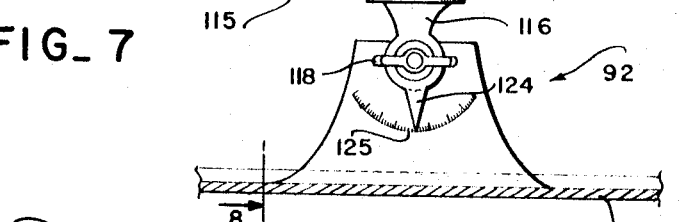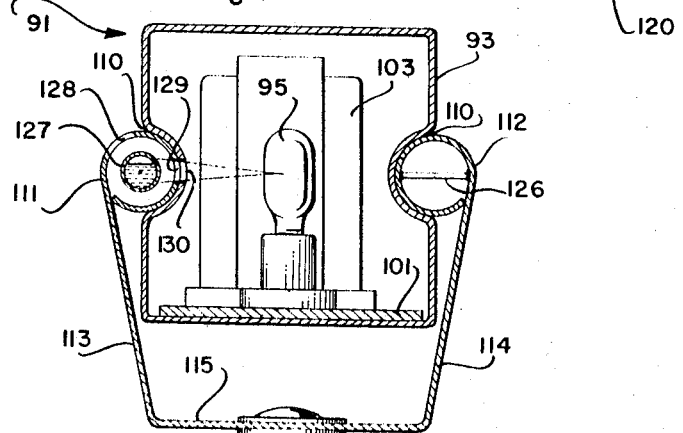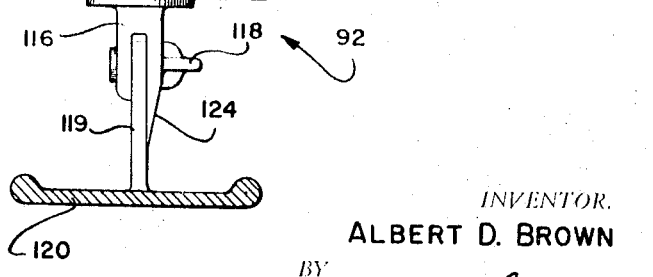

3,457,545
VISUAL APPROACH PATH INDICATOR
Albert D. Brown, Atlanta, Ga., assignor to Lockheed Aircraft Corporation, Burbank, Calif.
Filed Dec. 6, 1965, Ser. No. 511,591
Int. Cl. B64f 1/20; G08b 5/00; G08g 5/00
U.S. Cl. 340—25             10 Claims

ABSTRACT OF THE DISCLOSURE

Apparatus for providing multiple beams of distinguishable illumination for aircraft glide path guidance or other purposes. An optical assembly projects a multicolor beam of illumination upwardly from an aircraft runway at an angle defining a desired approach glide path. A pilot flying this glide path sees a given color—for example, green—if he is within the proper glide path, and sees other colors if he is above or below the desired path. One embodiment of this apparatus is completely self-contained and is portable for use in remote or field locations. This embodiment has the optical and electrical assembly slidably received within a housing. A pair of legs unfold from the assembly, and these legs are extendable at an end of the apparatus to level the apparatus and to adjust the desired glide path angle. The housing contains an additional elevation adjusting device at its other end. Another embodiment of this apparatus is intended for relatively permanent installation and includes a support which can be fixed in place and which is angularly adjustable to define a desired glide path. The beam projection part of this second embodiment can be quickly inserted or removed from the support, with the angle of elevation of the illumination beam being determined and maintained by the support position.

---

This invention relates in general to aircraft landing aids and in particular to apparatus for enabling the pilot of an aircraft to determine the proper glide slope for a landing approach.

During the approach of an aircraft to the runway for landing, it is essential that the pilot maintain the aircraft at the appropriate angle with respect to his intended point of touchdown on the runway. This line of approach, often referred to as the glide slope or glide path, must be maintained substantially constant within relatively narrow limits and the line must be measured with respect to the same given point of expected touchdown. Any material variance from this line of approach may cause the aircraft to strike an obstruction such as a tree or power line, or may cause touchdown of the aircraft onto the runway at a point either short of the end of the runway or dangerously far down the runway toward the opposite end thereof as a result of an improperly chosen touchdown point.

There are known in the art apparatus and techniques for solving the foregoing problem. For example, the well-known instrument landing system (ILS) enables the pilot of an airplane to maintain his craft on the proper approach path as defined by appropriate radio beams transmitted from the ground. Also, at airports equipped with ground-controlled approach (GCA) equipment, the pilot can be talked down by the ground controller if the need arises. Both of the foregoing techniques, however, require the presence on the ground of elaborate and expensive equipment, and the ILS system additionally requires the presence in the aircraft of radio receiving apparatus which is expensive and which adds weight to the craft. Because of this, many of the smaller public airports and virtually all private airports are equipped with neither of the fore-named landing aids. Furthermore, a substantial number of smaller aircraft are not equipped with ILS apparatus because of the added expense of such apparatus.

Although choosing and flying the proper approach path presents no particular problem to the skilled pilot during VFR (visual flying regulations) conditions, nighttime landings for the pilot whose plane is not equipped with ILS or who is landing at an airport having neither ILS nor GCA equipment presents a very real hazard. The magnitude of this hazard may be increased by the fact that the pilot is landing at a field having no runway lighting whatsoever or having only relatively rudimentary lighting.

While various apparatus have been devised which cause the pilot to see illumination of differing patterns and/or colors, depending on his position relative to the proper approach path, these apparatus have been relatively expensive, unwieldy or otherwise unsuited either to the needs of the small airport operator or of others who have need for a visual approach path indicator which can be easily and conveniently carried by one person and which is capable of being quickly and accurately placed in service independently of an external power source.

These problems are solved or substantially alleviated according to the present invention, which provides a visual approach path indicator of the type projecting a number of different colored beams of light upwardly from the end of the runway or from another point chosen on the ground. The pilot approaching the landing area endeavors to position his craft so that he sees illumination of a particular color. Misplacement of the craft upwardly or downwardly from the desired approach path causes the pilot to see illumination of different colors so that he is informed of the direction of deviation from the proper approach path. The apparatus of this invention is packaged to provide a visual approach path indicator which is of compact and lightweight construction, which may be readily carried about or transported in its stowed condition by an individual without undue fear of damage to the apparatus, and which may quickly and conveniently be positioned in the landing area and placed in operation. One embodiment of this invention includes a self-contained power source.

Accordingly, it is an object of this invention to provide an improved visual approach path indicator.

It is another object of this invention to provide a visual approach path indicator capable of furnishing a pilot with a visual indication of the proper landing approach path relative to a particular landing point.

A further object of this invention is to provide a visual approach path indicator capable of furnishing a pilot with a visual indication of undesirable deviations from the proper landing approach path.

Still another object of this invention is to provide a visual approach path indicator of relatively lightweight and compact construction.

Yet another object of this invention is to provide a visual approach path indicator readily capable of being carried by one person without so encumbering such person that he cannot perform other diverse tasks.

A still further object of this invention is to provide a visual approach path indicator having a stowed configuration and an operational configuration and being capable of rapid conversion between these two configurations.

Another object of this invention is to provide a visual approach path indicator which is sufficiently inexpensive to enable its acquisition by virtually all who have a need for such apparatus.

Still another object of this invention is to provide a visual approach path indicator which may be quickly and accurately placed in operative position.

The exact nature of this invention as well as other objects and advantages thereof will be readily apparent from consideration of the following specification relating to the annexed drawings in which:

3

FIGURE 1 shows an embodiment of apparatus according to this invention, with the inner assembly partially withdrawn from the tubular housing for illustrative purposes;

FIGURE 2 shows an elevational sectional view of the apparatus taken along line 2—2 of FIGURE 1, with the apparatus in operational readiness;

FIGURE 3 shows a view taken along line 3—3 of FIGURE 2;

FIGURE 4 shows a view taken along line 4—4 of FIGURE 2;

FIGURE 5 shows a rear elevation view taken along line 5—5 of FIGURE 2;

FIGURE 6 shows a perspective view of another embodiment of this invention;

FIGURE 7 shows an elevational sectional view taken along line 7—7 of FIGURE 6; and FIGURE 8 shows a sectional view taken along line 8—8 of FIGURE 7.

Stated generally, one embodiment of this invention provides a generally tubular housing within which is telescopically received the optical assembly along with the battery or batteries for supplying electrical power to produce the beams of illumination. One or more support members are provided at the forward end of the apparatus so that the apparatus may be elevated to provide the desired glide path angle. These support members may be pivotally and extensibly attached to the portion of the apparatus containing the optical assembly so that the members can be pivoted inwardly of and telescopically received within the outer case when the apparatus is not in use. At least one additional support member is provided at the rear of the apparatus for proper elevational positioning thereof.

Another embodiment of this invention includes a base member which may be permanently secured in place in a desirable location and into which the housing, including the optical assembly, can be quickly and readily attached or detached. This base member may be initially adjusted for the proper angular relationship to provide the desired approach path angle, so that attachment of the optical assembly to the initially adjusted base member automatically determines and ensures the proper angle of the beams of illumination.

More particularly and with reference to FIGURES 1, 2 and 3, there is shown on embodiment of a visual approach path indicator including a tubular housing indicated generally at 10 and having an inner assembly 11 slidably removably received within tubular housing 10. Inner assembly 11 includes a forward chamber 12 and a rearward chamber 13, with forward chamber 12 containing therein an optical bench assembly as detailed more fully below and rearward chamber 13 receiving the batteries necessary for the operation of this embodiment of the invention.

The optical bench assembly contained within forward chamber 12 comprises a source of illumination 14, a collimating lens 15 and three optical filters 16, 17 and 18 positioned in a vertical array. By way of example only and without intent to limit, filter 16 permits passage of amber illumination only, filter 17 permits passage of green illumination only, and filter 18 permits passage of red illumination only. Lens 15 is securely mounted in base 23 such that the top or free end of lens 15 is fractionally closer to illumination source 14 than is the bottom or secured end of lens 15. The slightly rearward tilt of lins 15 produced thereby is for a purpose which is explained below. The filters 16, 17 and 18 are secured to a threaded fitting 19 to which a cap 20 may be removably attached to protect the filters.

Illumination source 14, which may be a conventional incandescent bulb, is removably secured in base 24. Lamp base 24 and lens base 23 are attached to member 25, which forms the base portion of forward chamber 12. Base member 25 is attached at the rearward end thereof to wall member 26 and at the forward end thereof to a front member 27 which also serves to close completely the open end of tubular housing 10 when inner assembly 11 is completely received therein. Attached to the outside of front member 27 adjacent the upper edge thereof is catch member 28. As best shown in FIGURE 2, catch member 28 is engaged by hook 29 of latching device 30 to retain inner assembly 11 securely within tubular housing 10.

Top member 34 is secured at its forward and rearward ends, respectively, to front member 27 and wall member 26, thus forming a generally rectangular enclosure having open sides. Top member 34 has formed therein openings 35, 36 and 37, with each of these openings being exposed to illumination produced by illumination source 14. Received in opening 35 and secured to the under side of top member 34 is a bubble level 38 which may be of the circular or universal type. At least a portion of the under side 39 of bubble level 38 is transparent or translucent so that the illumination produced by illumination source 14 can pass upwardly into the bubble level for nighttime illumination thereof. The function of openings 36 and 37 is described below.

Associated with the front end of inner assembly 11 are a pair of extensible, leg-like support members 44 and 45. Each of support members 44 and 45 may, by way of example, include an outer member 46 which is extensibly and retractably received on an inner member 47. It may be found desirable at the option of the constructor to construct each support member 44 and 45 such that the support member may be rotatably adjusted to vary the length of the support member over a predetermined range, and additionally to have outer member 46 slidably extensible with respect to inner member 47 such that, whatever the amount of rotating or threaded adjustment, between the outer member and inner member, the outer member can be extended to a predetermined maximum amount of extension relative to the inner member without disturbing the aforesaid amount of rotational adjustment. To accomplish this, each of inner members may be threadedly received on support rod 54. Lock release button 48 may be provided to disengage the sliding lock connection between outer member 46 and inner member 47 to permit the aforesaid sliding movement. Each of support members 44 and 45 may have at the lower end thereof a suitable foot member 49 to enable the support members to maintain a firm engagement with the surface on which the apparatus is being used.

As best shown in FIGURE 1, the width of base member 25 of forward portion 12 is substantially less than the overall width of the inner assembly. The upper end of each of support rods 54 terminates in a clevis 50. Each clevis 50 is swivelably secured as by pin 51 or the like to a tab member 52 secured to the inner side of front member 27. As best shown in FIGURE 3, tab 52 is oriented with respect to the vertical axis of the apparatus such that support members 44 and 45 extend outwardly at an angle of, by way of example, 45° from this vertical axis. When each of support members 44 and 45 is in its innermost slidable position and when the threaded adjustment between inner member 47 and support rod 54 is appropriate, each of the support members may be pivoted upwardly to be completely contained within forward portion 12. This is best shown in FIGURE 2, wherein support member 44 is shown in phantom view in its stowed position. It thus can be seen that when both support members are in the stowed position, the inner member 11 can be completely telescopically received within tubular housing 10.

Provided at each of the lower corners at the front of tubular housing 10 is a cutout portion 53 dimensioned to permit the inner assembly 11 to be completely telescopically received within tubular housing 10 when the support members 44 and 45 have been folded downwardly from their stowed position into the fully unstowed position. In this way, the legs may be unstowed and, if desired, extended even though the inner assembly is completely received within the tubular housing to protect the various components of the apparatus and to prevent unnecessary illumination from escaping the apparatus. Cutout portion 53 is sized to enable support rod to extend therethrough.

The rearward chamber 13 of inner assembly 11 is dimensioned to receive the appropriate number of batteries 58 necessary to provide adequate power for illumination source 14. In the example illustrated, each of batteries 58 is a conventional 6-volt dry cell lantern battery having both negative terminal 59 and positive terminal 60 at one end thereof.

Since both of batteries 58 must be electrically connected in series to provide the necessary operating voltage, top member 61 of rearward chamber 13 has incorporated therein a pair of electrical leads 62 and 63, best shown in FIGURE 4. To preserve space and to provide for electrical leads which are not easily susceptible to physical damage, leads 62 and 63 advantageously may be formed by conventional printed circuit techniques on one side of top member 51. A back member 64 contains suitable electrical contacts for engagement by the battery terminals of the rearward battery, and these electrical contacts are connected by suitable leads to one end of electrical leads 62 and 63. The back portion of wall member 26 has similar electrical contacts for engagement by the terminals of the forward battery. The electrical contacts on wall member 26 are electrically connected with the circuit including leads 62 and 63, illumination source 14, and a switch 65 to provide the desired series circuit. Of course, the conductive elements on back member 64 and the leads 62 and 63 contained on top portion 61 would not be required in an embodiment where only one battery 58 was necessary. The depicted configuration, having a pair of batteries one behind another, was chosen because this provided an apparatus having minimum dimensions in height and width.

Tubular housing 10, which in the illustrated embodiment is generally rectangular in cross section, may be fabricated from an extrusion of a material each as aluminum or the like, or, alternatively, tubular housing 10 may be built up from the members necessary to form sides, the top, the bottom, and the closed end thereof. Contained on the top 69 of the tubular housing is a sighting tube 70 fixedly aligned along one edge of top 69 and containing therein a pair of sighting hairs 71 and 72. Also contained on the top 69 of tubular housing 10 is an aperture 73 which may contain a window made of a transparent material and which is positioned along the center line of top 69 such that when inner assembly 11 is completely telescopically received within tubular housing 10, opening 73 is aligned with bubble level 38 to enable the bubble level to be viewed through the opening.

Also contained on top 69 are a pair of transparent or translucent members 74 and 75. Members 74 and 75, which are in alignment along a line parallel to the longitudinal axis of housing 10 and which may be along the center line of top 69, are positioned so as to be in alignment with openings 35 and 36 of top member 34 when inner assembly 11 is completely telescopically received within tubular housing 10. In this way, light from illumination source 14 is visible on members 74 and 75 for a purpose set forth below.

Contained at the rearward end 76 of tubular housing 10 is an adjustable support member 77 which is slidably frictionally secured with a knob 78 connected to a screw shaft which is threadably engaged in a hole contained in rearward end 76. Support member 77, which may consist of a platelike member having folded side portions 79 and a folded bottom portion 80, contains an elongated slot 81 through which passes the screw shaft bearing knob 78.

Contained on support member 77 on either side of elongated slot 81 are a pair of apertures 85 and 86, best shown in FIGURE 5. These apertures 85 and 86 are positioned to be in alignment with respective columns 87 and 88 of indicia borne on rearward end 76. It can be seen that for any position of support member 77 with respect to rearward end 76, a number from indicia column 88 appears in aperture 86 and a number from indicia column 87 appears in aperture 85. In the example shown, the indicia of column 88 range from "1" to "10," while the indicia of column 87 range from "10" to "15."

The operation of the embodiment of this invention depicted in FIGURES 1 through 5 will now be described. It is generally considered desirable for the pilot of a landing aircraft to approach the near end of the runway at a desired angle which may be, for example, approximately 3° with respect to horizontal. By positioning the apparatus of this invention such that the green beam produced by green filter 17 is aligned at the desired angle, for example 3°, to the horizontal, a pilot flying the approach path defined by this invention sees a green band of light if he is in the desired approach path. If the pilot drops below this desired approach path, a red band of light produced by red filter 18 is seen; while if the pilot climbs above the desired approach path, an amber band of light as produced by amber filter 16 is seen.

In setting up the apparatus of this embodiment for use, inner assembly 11 is withdrawn from tubular housing 10 a sufficient distance to enable support members 44 and 45 to be pivoted downwardly from their stowed position. The inner assembly 11 then is resinserted within tubular housing 10 and positively retained therein by means of latching device 30. The apparatus next is positioned at a desired location on or near the end of the runway or landing area and knob 78 is loosened to permit support member 77 to be dropped to its lowermost position. Knob 78 then is tightened to secure support member 77, and bubble level 38 is observed through opening 73 to determine whether the apparatus is level. If such is not the case, either or both of support members 44 and 45 are adjusted in length by means of the threaded provision therefor until a level position of the apparatus is attained.

Once the foregoing has been done, knob 78 then is loosened and support member 77 is moved with respect to rearward end 76 until there appears in aperture 86 the number corresponding to the angle of the desired approach path. Knob 78 then is tightened and the apparatus allowed to rest on the ground or other support surface, having, of course, been longitudinally aligned with respect to the runway.

Once the foregoing steps have been accomplished, the center line of the green beam is established at the angle appearing in aperture 86. In addition to this angle, lens 15 as mentioned previously is tipped backwardly from true horizontal by a factor amounting to, for example 2°. This serves as an added safety factor so that an angle appearing in aperture 86 as, for example, 3° actually is at 5° with respect to true horizontal.

If an angle of approach greater than permitted by the indicia of column 88 is desired, then after the apparatus has been leveled as aforementioned, both of support members 44 and 45 are slidably extended to the full amount of such extension. Knob 78 then is loosened and in aperture 85 is located the number corresponding to the desired approach path angle. In the particular example shown, it may be seen from FIGURES 2 and 5 that extension or retraction of support members 44 and 45 produces a 5° difference in the maximum available approach path angle of this apparatus. Of course, other angular differences could be provided as desired.

In many instances the runway chosen for landing by the pilot may have obstructions such as trees, power lines or the like, situated sufficiently closely to the near end of the runway to constitute a hazard upon landing. If such is the case, the person setting up the visual approach path indicator apparatus of this invention may utilize the sighting devices thereof to align the illumination beams of the apparatus with a clear region through which the pilot may fly without danger of striking such obstructions. One such sighting device is sighting tube 70 and the sighting hairs 71 and 72 contained therein. After support members 44 and 45 have been unfolded from the stowed position and the inner assembly completely received within the tubular housing, the operator next aligns sighting hairs 71 and 72 with a desired point on the horizon which should ensure a safe approach path for an incoming airplane. The plane defined by sighting hairs 71 and 72 actually lies within the lowermost or red light beam projected by the apparatus, so that even if these sighting hairs are aligned with the top of an obstruction such as a tree, a pilot flying in on the green beam will not strike this obstruction. Alternatively, and particularly for use where the apparatus of this invention may be set up at night or under other conditions of poor illumination, transparent or translucent members 74 and 75 may be used as a substitute for the sighting tube and sighting hairs. By turning on illumination source 14, light therefrom passes through openings 36 and 37 in top member 34 and thence through members 74 and 75. The light passing through such members, as seen by one sighting along the top 69 of tubular housing 10, appears as two spots of illumination which define the longitudinal center line of the apparatus. Members 74 and 75 may advantageously be constructed of glass, plastic or the like, and may be of differing colors so that alignment of the two illumination spots with the desired point on the horizon may be more quickly accomplished.

The above-described embodiment of this invention is particularly useful and advantageous in applications where a lightweight, compact, self-contained, and easily carried visual approach path indicator is desired. Because the apparatus of this embodiment is self-contained and requires no external power supply, it may be used anyhere; and it is sufficiently light in weight to be readily carried by a person a considerable distance to a landing area. In one example of this invention constructed according to the aforementioned embodiment and using two 6-volt batteries in series to supply 12 volts to a GE #965 9.8 volt bulb, the unit was found to have an effective range of approximately three statue miles. Substitution of a projection-type optical system materially increased this range, indicating that adequate range might be obtainable using a single 6-volt battery in conjunction with a 6-volt bulb.

In applications where the degree of portability and the self-contained features of the above-mentioned embodiment are not desired, the embodiment illustrated in FIGURES 6 through 8 may be useful. This second embodiment includes a housing assembly indicated generally at 91 and removably receivable in a support indicated generally at 92. Housing 91 includes a main body member 93 and a front member 94 removably attached to the main body member.

Contained within main body member 93, as best shown in FIGURE 7, are an illumination source 95, a lens 96 and a three-color optical filter arrangement 97 generally corresponding to filters 16, 17 and 18 of FIGURE 2. Filter assembly 97 is mounted in threaded receptacle 98 over which may be received a suitable cap (not shown) to protect the filter assembly.

Illumination source 95 and lens 96 are mounted on base member 101, which in turn is removably attached by means of bolt 102 to main body member 93. Also contained on base member 101 is an electrical transformer 103 having a primary side connected to a suitable cord 104 for connection to a conventional 115-volt source and having a secondary side connected through switch 105 to illumination source 95. A second power cord 106 also is connected to illumination source 95 through switch 105. In this way, if illumination source 95 is an incandescent lamp which can operate from, for example, 12 volts, then the unit of this embodiment can be powered either from a conventional 115-volt source or from any available 12-volt source, such as an automobile battery. Power cord 106, accordingly, may be provided with a plug 107 suitable for insertion into the cigarette lighter found on most automobiles.

The main body member 93 has on each side thereof a generally elongate recess 110. Within these recesses 110 are received elongate generally tubular clamping members 111 and 112, respectively. Each of clamping members 111 and 112 is attached to and may be integrally formed with generally vertical clamping member supports 113 and 114, which, as best shown in FIGURES 6 and 7, are connected at the lower end thereof with a base member 115 and which may be conveniently formed from a single piece of sheet metal rolled and bent to the appropriate shape. However clamping members 111 and 112 and clamping member supports 113 and 114 may be formed, these components should be dimensioned such that when clamping members 111 and 112 are received within recesses 110 the housing assembly 91 is firmly positioned and secured by the inwardly directed bias of these clamping members. The resilient inward bias provided the clamping members by supports 113 and 114 enables the housing assembly 91 to be readily removed and inserted into support 92 without the use of tools or the like.

Base member 115 is attached to support 116, which is swivelably connected by means of bolt 117 and wing nut 118 to upstanding member 119 secured to foot member 120. Support 116 includes an indicator pointer 124 which coacts with an angle degree scale 125 contained on upstanding member 119.

Each of clamping members 111 and 112 preferably are substantially hollow, and contained within member 112 are a pair of sighting hairs 126 corresponding to sighting hairs 71 and 72 in FIGURE 1. Only one of sighting hairs 126 is depicted in FIGURE 7. In the other clamping member 111 there may be secured a linear bubble level 127 which may be viewed through opening 128 cut out in clamping member 111. A second opening 129 in clamping member 111 is positioned so that when housing assembly 91 is received in support 92, opening 129 coacts with opening 130 contained in recess 110 whereby light from illumination source 95 passes through openings 130 and 129 to illuminate bubble level 127 for nighttime viewing. With a clamping member 112 of appropriate internal dimensions, the sighting hairs 126 may be omitted without materially impairing the function of this member as a sighting device.

The apparatus of this second embodiment may be used, for example, in applications where a given landing area requires the use of a visual approach path indicator from time to time but where it is desired to store such apparatus for safekeeping at times of nonuse without the necessity of unfolding the legs, releveling the apparatus and making the other adjustments necessary with the first embodiment of this invention. In the use of the second embodiment, support 92 may be relatively permanently attached as by mounting in a base made of concrete or the like at the desired runway location. Housing assembly 91 then is inserted in support 92 and aligned to provide the desired approach path. This alignment may be either through the use of angle scale 125 and bubble level 127 or through the use of the sighting tube formed by clamping member 112 and the sighting hairs 126 contained therein. If desired, angle scale 125 could be contained on a separate member fixedly movable with respect to upstanding member 119, so that pointer 124 could conveniently be initially aligned with a zero or other reference point on the angle scale without regard for precise leveling of support 92 during installation thereof.

Once the glide path angular alignment has been accomplished, wing nut 118 is securely tightened and housing assembly 91 may be removed from support 92 until the use of the apparatus is required. At that time, the housing assembly may be quickly and easily inserted into the support and retained therein through the action of clamping members 111 and 112 resiliently biased into recesses 110, with the angular alignment of the housing assembly being ensured by the positioning of the prealigned support. Power to operate the apparatus of this embodiment may be supplied either through a conventional 115-volt source available at the point of use or from the battery of an automobile or other vehicle parked adjacent the location of use.

From the foregoing it can be seen that there have been described two embodiments of a visual approach path indicator apparatus which can be relatively inexpensively fabricated, which are easy to set up and operate, and which may be relatively easily transported. No additional equipment is required for the use of this invention, either on the ground or in the aircraft, and the apparatus may be kept in a secure location to prevent damage from vandals, ground vehicles or other sources while the apparatus is not actually in use.

Although the apparatus of this invention has been described in an aviation use environment, other applications of this invention will be evident to those skilled in the art. For example, the three light beams of this invention are layered horizontally when the apparatus or the optical portion thereof is rotated on its longitudinal axis 90° from the depicted arrangement. This horizontal arrangement has been found to provide a useful and inexpensive navigation aid to persons attempting to navigate a boat on a channel or to a mooring location at nighttime.

What is claimed is:

1. Visual approach path indicator apparatus which is compact and readily portable, comprising:
   a housing assembly having a hollow interior portion and an opening at one end thereof;
   an inner assembly at least a substantial portion of which is slidably receivable in said hollow portion of said housing assembly through said opening thereof;
   support means movably connected to said inner assembly, said support means being movable to a stowed position to be completely received within said inner assembly and to be completely received within said housing assembly while said inner assembly is completely received in said housing assembly movable to a support position whereat said support means extends outwardly of said inner assembly to form a depending support adjacent one end thereof while said inner assembly is completely received in said housing assembly; and
   optical means associated with said inner assembly for projecting a beam of informational illumination outwardly therefrom.

2. Apparatus as in claim 1 wherein said support means is of adjustable length.

3. Apparatus as in claim 1, further comprising:
   at least one additional support member adjustably attached to the end of said housing assembly opposite said one end thereof to maintain said opposite end at a selectively elevated position with respect to a surface on which the apparatus rests; and
   cooperating angle-indicative indicia and index means, one of said indicia and index means being on said opposite end and the other of said indicia and index means being on said additional support means for indicating the angle defined by said two ends of said housing assembly and the surface on which the apparatus rests.

4. Apparatus as in claim 1, wherein:
   said support means comprises a pair of separate support members each of which is pivotally attached to said inner assembly so as to be pivotally movable between said support position and said stowed position;
   said housing assembly having openings therein permitting passage of said separate support members when said inner assembly is received in said housing assembly and said separate support members are in said support position.

5. Apparatus as in claim 4, wherein each of said separate support members includes:
   an inner portion pivotally attached to said inner assembly and having a threaded portion spaced apart from said pivotal attachment;
   an intermediate portion threadedly engaged with the threaded portion of said inner portion so that threaded rotation of said intermediate portion relative to said inner portion adjusts the spacing between said intermediate portion and said pivotal attachment; and
   an outer portion translatably received on said intermediate portion,
      said outer portion being selectively lockably translatable with respect to said intermediate portion within a predetermined range of movement.

6. Visual approach path indicator apparatus comprising:
   a housing;
   a source of illumination positioned within said housing;
   said housing having an aperture through which a directed beam of illumination produced by said source of illumination can pass;
   optical filter means contained in said housing and disposed in the optical path between said source of illumination and said aperture;
   a support structure separate from said housing,
      said support structure having a first portion defining a base member and a second portion connected to said first portion in selectively lockable pivotal relation therewith to adjust and secure the angular elevation of said second portion relative to said base member;
   said second portion including securing means detachably engageable with said housing;
   said housing having on a portion of the exterior thereof securing means matingly engaging said securing means of said second portion to removably support said housing,
      the angle of elevation of the beam of illumination when said housing is engaged with said second portion being predetermined by the pivotal relation between said base member and said second portion.

7. Apparatus as in claim 6, wherein:
   said securing means on said housing comprises a plurality of recesses formed in said housing; and
   said securing means on said second portion comprises a plurality of members configured to be received in said recesses in engaging relationship therewith.

8. Apparatus as in claim 7, wherein:
   at least one of said plurality of members configured to be received in said recesses is in the form of a hollow tubular member having its longitudinal axis substantially in alignment with the directed beam of illumination passing through said aperture in said housing so that said tubular member provides an optical sight to aim the directed beam of illumination.

9. Apparatus as in claim 6, wherein:
   said securing means on said housing comprises at least one engagement means on each of two opposite sides of said housing; and
   said securing means on said second portion comprises a pair of opposed spaced apart arms dimensioned to receive said housing therebetween, each of said arms having a holding means positioned to be aligned with a corresponding engagement means when said housing is received between said arms, said holding means being configured to securely holdingly engage said engagement means so that the angular elevation of said housing when received in said support structure is determined by the angular elevation of said second portion of said support structure.

10. Apparatus as in claim 9, wherein:

each of said engagement means comprises a recess formed in the side of said housing; and each of said holding means comprises a protrusion snugly engageable in a corresponding one of said housing recesses, said opposed spaced apart arms being resiliently biased one toward the other to urge said protrusions into engagement with said housing recesses when said housing is received between said arms and to enable removal of said housing from said second portion by movement of said arms against the direction of resilient bias to withdraw said protrusions from engagement with said recesses.

References Cited

UNITED STATES PATENTS

| | | | |
|---|---|---|---|
| 2,566,064 | 8/1951 | Keim | 174—50 X |
| 2,823,017 | 2/1958 | Schaus | 248—13 X |
| 2,913,702 | 11/1959 | Ferguson et al. | 340—25 X |
| 3,138,779 | 6/1964 | Murry et al. | 340—26 |
| 3,148,583 | 9/1964 | Maiershofer | 248—11 |

THOMAS B. HABECKER, Primary Examiner

CHARLES M. MARMELSTEIN, Assistant Examiner

U.S. Cl. X.R.

240—1.2; 340—366

PO-1050
(5/C )

UNITED STATES PATENT OFFICE
CERTIFICATE OF CORRECTION

Patent No. 3,457,545                    Dated July 22, 1969

Inventor(s) Albert D. Brown

It is certified that error appears in the above-identified patent and that said Letters Patent are hereby corrected as shown below:

Claim 1, line 14, the portion reading "movable to a support position" should read -- and movable to a support position --.

SIGNED AND
SEALED
NOV 18 1969

(SEAL)
Attest:

Edward M. Fletcher, Jr.
Attesting Officer

WILLIAM E. SCHUYLER, JR.
Commissioner of Patents